3,016,284
PROCESS FOR INTRODUCING STERILE MATERIAL IN APPARATUS HAVING CONTROLLED ATMOSPHERE
Philip C. Trexler, Niles, Mich., assignor to University of Notre Dame du Lac, Notre Dame, Ind., a corporation of Indiana
Filed Sept. 11, 1957, Ser. No. 683,398
2 Claims. (Cl. 21—2)

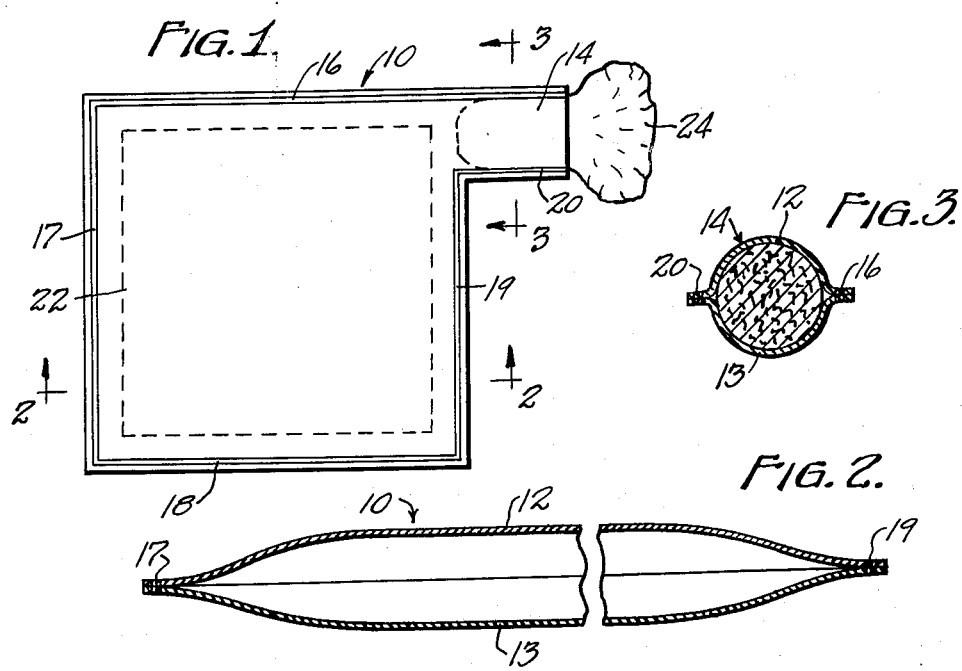

This invention relates to a sterile container for introducing material into apparatus having a controlled atmosphere. The invention finds particular utility for use in connection with apparatus of the character disclosed in my copending patent application for Isolator Structure, Serial No. 656,396, filed May 1, 1957. It also may be useful with apparatus of the types shown in the following patents of J. A. Reyniers:

No. 2,219,564, dated October 29, 1940, for Surgical Operating Device; No. 2,244,082, dated June 3, 1941, for Apparatus for Working with Biological Specimens, etc.; and No. 2,516,419, dated July 25, 1950, for Biological Apparatus.

The primary object of this invention is to provide a novel, simple and inexpensive cartridge providing means for introducing into an apparatus having a controlled atmosphere material to be used in that apparatus in a sterile condition.

A further object is to provide a container of this character formed of inexpensive light weight material which is preferably transparent to permit viewing of the contents thereof and which is readily sealed or severed as occasion requires, and which can be readily sterilized both externally and internally without destroying the sealed condition thereof after being loaded.

Other objects will be apparent from the following specification.

In the drawing:
FIG. 1 is a side view of the container preparatory to sterilization thereof;
FIG. 2 is an enlarged transverse sectional view taken on line 2—2 of FIG. 1;
FIG. 3 is an enlarged transverse sectional view taken on line 3—3 of FIG. 1;
FIG. 4 is a side view of the container in loaded and sealed condition;
FIG. 5 is a face view of the container in its loaded and sealed condition, ready for storage or for introduction into apparatus having a controlled atmosphere,
FIG. 6 is a schematic view illustrating an arrangement for sterilizing multiple containers.

Referring to the drawing which illustrates the preferred embodiment of the invention, the numeral 10 designates a container which is formed of two similar sheets 12 and 13 of a film material which is preferably of the type capable of being heat-sealed and which will withstand temperatures in the order of 250 deg. F. without injury thereto or damage thereof and which is impervious to germicides. Films of the type usable for this purpose include "Saran," a thermoplastic resin produced by the polymerization of vinylidene chloride alone or with other monomers; "Mylar," a polyethylene terephthalate resin; "Kel F," a thermoplastic resin which is a polymer of trifluorochloroethylene; "nylon," a polyamide resin made by the polymerization of a hexamethylenadiamine salt of adipic acid; and a high temperature resistant polyethylene. The two sheets 12 and 13 are preferably of the same shape and include a body portion of any desired shape, such as a substantially square shape as here shown, and a projecting tab portion 14. The two sheets are bonded together, as by heat-sealing thereof along the lines 16, 17, 18, 19 and 20, so as to define a substantially continuous marginal seal around the container interrupted only at the neck portion 14 defined by the lateral projections of the sheets 12 and 13. The container is of a size to receive the material 22 which is to be introduced into an apparatus having controlled environment and this material may include food, dressing material, tools or the like. If desired, the container may be preformed and the material 22 inserted therein through the neck 14, or the material 22 may be superimposed upon one of the sheets 12, 13 in centered position, followed by application of the other of the two sheets 12, 13 to the first sheet and by the heat sealing operation to define the seams 16, 17, 18, 19 and 20. After the package has been loaded, a quantity of surgical cotton 24 may be stuffed into the neck 14 to provide a filter therein.

In the preparation of the unit for introduction into a chamber having a controlled atmosphere, the container or envelope with its contents packed therein is then subjected to a sub-atmospheric pressure for the purpose of evacuating air from the container through the neck 14 and the filter 24 thereof. A vacuum of approximately 25 inches of mercury will accomplish this purpose. Then while the container is still evacuated of air, steam is introduced through the neck 14 thereof and serves to sterilize the interior surfaces of the container or envelope and to penetrate and sterilize the contents 22, which penetration is facilitated by the evacuated condition within the container. The steps of evacuating air from the envelope and then introducing steam therein may be performed in a conventional sterilizer of the character well understood in the art and commonly referred to as a steam sterilizer.

After the envelope and its contents have been effectively sterilized as described above, the envelope is removed from the steam sterilizer and is subjected to the heat-sealing operation along the line 21 inwardly of the filter plug 24 to seal the neck 14 and completely close the envelope. The sterility of the envelope and its contents is assured during the performance of this sealing operation by virtue of the filter plug 24 which forms a barrier to passage of air borne infective elements or micro-organisms into the container and which forms a barrier to entry of solid infective elements into the container. After the seal 21 is completed the neck 14 may be severed from the container by cutting the same along the line 26, thereby reducing the container to minimum size without endangering the same.

The sealed container in the condition shown in FIG. 5 is then ready to be introduced into apparatus of the types disclosed in the above identified patent application and patents having a controlled environment and provided with an access chamber or lock chamber with a releasable sealed closure between the access chamber and the specimen chamber of the apparatus, and a releasable sealed exterior access closure. The access chamber will also have means for sterilizing the contents thereof, such as means for spraying a germicide into said chamber in apparatus of the type shown in my patent application Ser. No. 656,396, said spray being either of the gaseous or the liquid type, or means to supply steam thereto. The sealed envelope 10 is inserted into the access chamber which is then resealed. The sterilizing means is then operated to sterilize the access chamber and the exterior of the envelope by subjecting the same to a sterilizing medium. The inner closure of the access chamber is then opened into communication with the specimen-containing chamber of the apparatus while sealed from atmosphere, and the envelope 10 is passed from the access chamber into the specimen chamber, whereupon the inner closure of the access chamber is resealed. The envelope 10 can then be severed and opened within the interior of the specimen-containing chamber for removal of its contents by inserting the hands and arms into flexible gloves carried by the apparatus.

I have found that an envelope 10 and its contents can be most effectively and conveniently sterilized by employing saturated steam at temperatures in the order of 120 deg. C., under a pressure of 15 pounds gauge pressure or two atmospheres at absolute pressure. This medium provides the minimum temperature which will serve effectively for purposes of sterilization at the minimum pressure within the minimum period of time.

In cases where the contents 22 of the envelope 10 are food, prolonged sterilization is required due to the resistance of the cotton plug 24 to the flow of steam therethrough. In order to reduce the amount of time consumed in sterilizing a number of food-containing envelopes, an arrangement of the type shown in FIG. 6 may be employed. This arrangement utilizes a manifold 30 having a number of outlets 32 at each of which an envelope 10 is connected at its neck 14. The manifold communicates with a filter chamber 34 of large volume using a filter element of lesser density than cotton fibers, but of larger volume, such as a mass of intermingled glass fibers commonly known as glass wool. A line 36 leads to a source of steam. The time required for sterilization is reduced because the glass wool has a low resistance to flow of steam therethrough. It will be understood that the steps of air evacuation prior to steam supply, and of sealing off the neck 14 at 21 will be followed as described above, the latter occurring before the envelopes 10 are disconnected from the manifold.

While the preferred embodiment of the invention has been illustrated and described herein, it will be understood that changes in the construction may be made within the scope of the appended claims without departing from the spirit of the invention.

I claim:

1. The method of introducing material through a sealable sterilizing lock into an apparatus having a selected atmosphere, comprising packaging said material in an envelope formed of fluid-impervious synthetic resin flexible film material capable of being heat sealed, said envelope having an open ended reduced neck communicating therewith containing a filler of porous material, evacuating air from said envelope through said neck and filler, introducing steam into said envelope through said neck and filler to sterilize the interior of said envelope and its contents, heat-sealing said envelope transversely of said neck between said filler and the body of said envelope to seal said neck while said envelope and its contents are protected from air-borne organisms by said filler, inserting said sealed envelope in said lock and exteriorly sterilizing the envelope in said lock while sealed, opening said lock into communication with said apparatus without altering said selected atmosphere to insert said envelope in said apparatus, and opening said envelope within said apparatus.

2. The method of introducing material through a sealable sterilizing lock into an apparatus having a selected atmosphere, comprising packaging said material in an envelope formed of fluid-impervious flexible film of synthetic resin material capable of being heat sealed, said envelope having a reduced open ended neck communicating therewith and containing a porous plug, evacuating air from said envelope through said neck and plug, introducing steam into said envelope through said neck and plug to sterilize the interior of said envelope and its contents, heat-sealing said envelope transversely of said neck to seal said neck inwardly of said plug while said plug remains in said neck, inserting said envelope in said lock, while sealed, externally sterilizing said sealed envelope in said lock, opening said lock into communication with said apparatus and transferring said envelope into said apparatus without altering said selected atmosphere, and opening said envelope within said apparatus.

References Cited in the file of this patent

UNITED STATES PATENTS

| | | |
|---|---|---|
| 1,889,629 | Bohmer et al. | Nov. 29, 1932 |
| 2,349,661 | James | May 23, 1944 |
| 2,645,557 | Lewis et al. | July 14, 1953 |
| 2,701,229 | Scherr | Feb. 1, 1955 |
| 2,770,235 | Nesset et al. | Nov. 13, 1956 |
| 2,783,599 | Weikert | Mar. 5, 1957 |
| 2,800,269 | Smith | July 23, 1957 |
| 2,853,069 | Beachman et al. | Sept. 12, 1958 |
| 2,893,547 | Earle et al. | July 7, 1959 |